(12) United States Patent
Roddis

(10) Patent No.: US 8,939,413 B2
(45) Date of Patent: Jan. 27, 2015

(54) SEAL SUPPORT SYSTEM

(75) Inventor: Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 1299 days.

(21) Appl. No.: 12/621,215

(22) Filed: Nov. 18, 2009

(65) Prior Publication Data

US 2010/0123055 A1 May 20, 2010

(30) Foreign Application Priority Data

Nov. 18, 2008 (GB) .................................. 0821003.1

(51) Int. Cl.
*A47F 5/00* (2006.01)
*F16J 15/34* (2006.01)
*F16J 15/40* (2006.01)

(52) U.S. Cl.
CPC ............ *F16J 15/3404* (2013.01); *F16J 15/406* (2013.01)
USPC ................ 248/125.8; 248/222.52; 248/309.1; 248/519; 248/121

(58) Field of Classification Search
USPC ........ 248/125.8, 125.9, 122.1, 127, 158, 157, 248/176.1, 176.3, 205.1, 274.1, 309.1, 419, 248/222.52, 519, 121; 454/237; 606/131, 606/133
See application file for complete search history.

(56) References Cited

U.S. PATENT DOCUMENTS

| 5,251,127 | A | * | 10/1993 | Raab .............................. 606/130 |
| 6,013,087 | A | * | 1/2000 | Adams et al. ................. 606/130 |
| 6,612,533 | B2 | * | 9/2003 | Biles et al. ................. 248/354.1 |
| 7,523,911 | B2 | * | 4/2009 | Carnevali ...................... 248/404 |
| 7,802,768 | B2 | * | 9/2010 | Carnevali ...................... 248/412 |
| 8,048,090 | B2 | * | 11/2011 | Qureshi et al. ................. 606/133 |
| 2009/0005765 | A1 | * | 1/2009 | Oostman et al. ................... 606/9 |
| 2011/0009809 | A1 | * | 1/2011 | Bielfeldt et al. ................ 604/23 |

* cited by examiner

*Primary Examiner* — Todd M Epps
(74) *Attorney, Agent, or Firm* — Edwin D. Schindler

(57) ABSTRACT

A seal support system for a device for sealing an item of rotating equipment, including a device for generating air movement, includes a vessel for holding fluid for supplying to the sealing device. The system further includes an adjustable stand on which the vessel is mounted and a device for deflecting air along a path into which the vessel can be positioned.

13 Claims, 4 Drawing Sheets

SEAL SUPPORT SYSTEM

BACKGROUND OF THE INVENTION

1. Technical Field of the Invention

Figure 1:
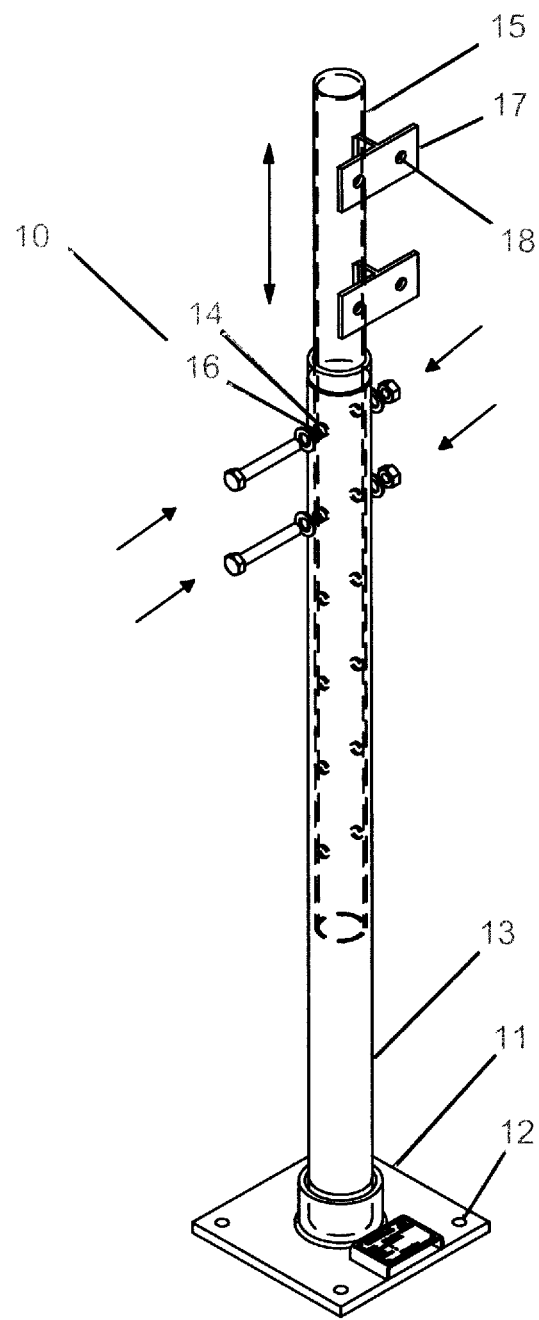

The present invention relates to seal support systems and, more particularly, to systems which are used with mechanical seals for containment of process fluid.

2. Description of the Prior Art

Sealing devices, such as mechanical seals are employed to seal items of rotating equipment such as centrifugal pumps.

The sealing device is often connected to a seal support system which permits fluid from said system to the sealing device.

Some systems permit fluid to pass to the sealing device in one direction, such as a heat exchanger system which passes fluid to the sealing device for discharge into the item of rotating equipment.

Some systems permit fluid to pass and return to the sealing device in a closed loop arrangement.

The fluid within the system is generally chosen so that it lubricates and cools the components within the sealing device, whilst being compatible with the process fluid. The industry term for the fluid contained within the vessel, is Barrier or Buffer fluid.

It is not uncommon for the seal support system to have other items of equipment, sited around the vessel, to permit pressure being applied to the barrier/buffer fluid, or to allow additional cooling or fluid circulation around the seal.

Irrespective of the arrangement, the seal support system must be suitably mounted preferably in close communication to the sealing device and item of rotating equipment. Therefore a stand is required.

Some sealing devices rely on principles of convection to circulate the fluid from the system to the seal and back again. For said fluid convection to efficiently happen, the system should be ideally positioned in both the horizontal and/or vertical axis with respect to the seal.

A stand which permits vertical and horizontal adjustment is deemed highly advantageous to fine-tune system position so to optimise fluid convection.

Sealing devices such as mechanical seals generate heat from the counter rotational sealing faces. For improved seal life, this heat is transferred into the system barrier fluid so that it can be effectively dissipated from the sealing system. Unfortunately, there is a physical limitation on the effectiveness of any seal support system to dissipate heat. For this reason, additional cooling means are employed. Such cooling means include cooling coils within the system and/or finned tubing and/or air blast coolers.

It is understood that moving air has a far higher heat removal characteristic than stagnant air. Unfortunately, air blast coolers add a further complexity to the system which is undesirable.

It is deemed to be specifically advantageous if the seal support system, containing the barrier fluid, can be precisely positioned over the electric motor of the item of rotating equipment such that the air circulated from the operation of the electric motor is directed towards the seal support system.

SUMMARY OF THE INVENTION

According to the present invention there is provided a seal support system for a device for sealing an item of rotating equipment, including means for generating air movement, the system comprising a vessel for holding fluid for supply to said sealing device, a stand having a base, means for securing the stand to said vessel and means to allow said vessel to be moved with respect to said base, air deflection means for at least partially surrounding the air movement generating means so as to deflect moving air from the vicinity of the air movement generating means along a path into which the vessel can be positioned.

Preferably, said stand has a plurality of orifices, so that a range of vertical height positions can be accommodated.

Preferably, said base member has one or more orifices so that it can be secured to the floor.

Preferably said seal support system attachment means comprises a bracket with one or more orifices that correspond with one or more orifices of the seal support system.

Preferably said stand has a vertical adjustment means and a horizontal adjustment means.

Preferably the horizontal adjustment means is secured to a fixed vertical member.

Preferably the horizontal adjustment means comprises a fixed horizontal member secured to the floating vertical member and the floating horizontal member is in communication with the fixed horizontal member.

Preferably the air movement generating means is an electric motor.

The present invention also provides a method for cooling fluid contained within a vessel forming part of a seal support system for device for sealing an item of rotating equipment including means for generating air movement, the method comprising mounting the vessel on an adjustable stand, mounting air deflection means so as at least partially to surround the air movement generating means whereby, in use, a path of air from the means for generating air movement is provided by said deflection means, and adjusting the stand so as to position the vessel within said path.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

Figure 2:
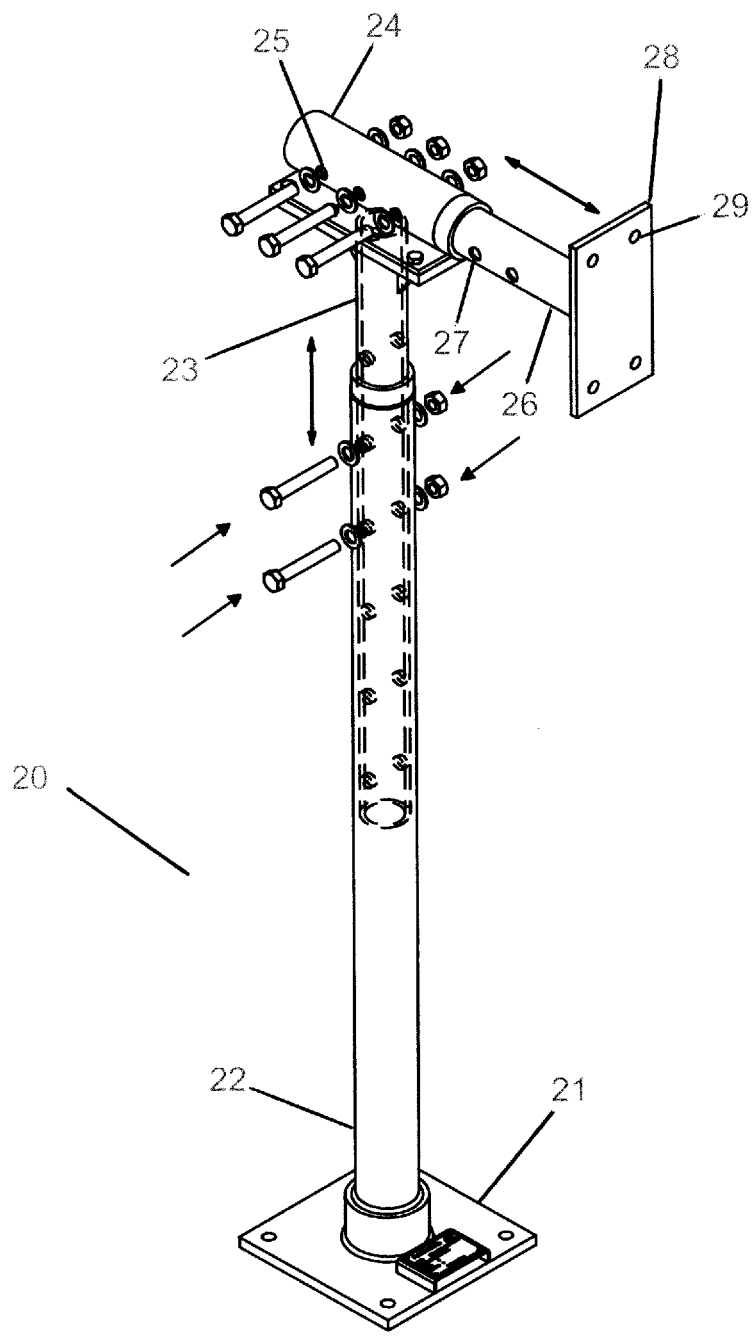
Figure 3:
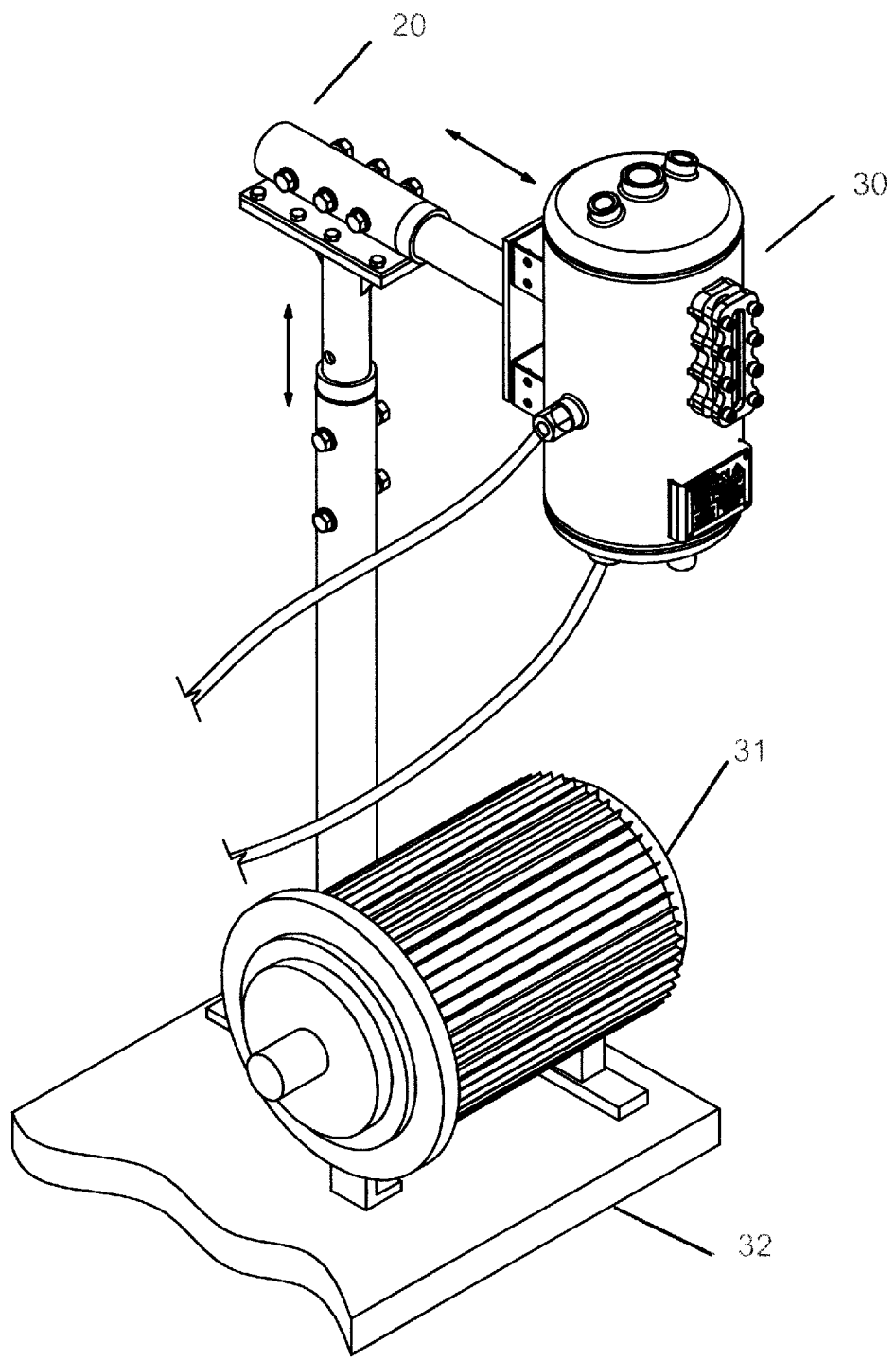

In the drawing, wherein similar reference numerals and symbols denote similar features throughout the several views:

FIG. 1 is an isometric view of a vertically adjusting stand of the first embodiment of the invention FIG. 2 is an isometric view of a vertically and horizontally adjusting stand of the second embodiment of the invention FIG. 3, is an isometric view of the stand of the invention, mounted with a seal support system and positioned vertically over an electric motor of an item of rotating equipment.

Figure 4:
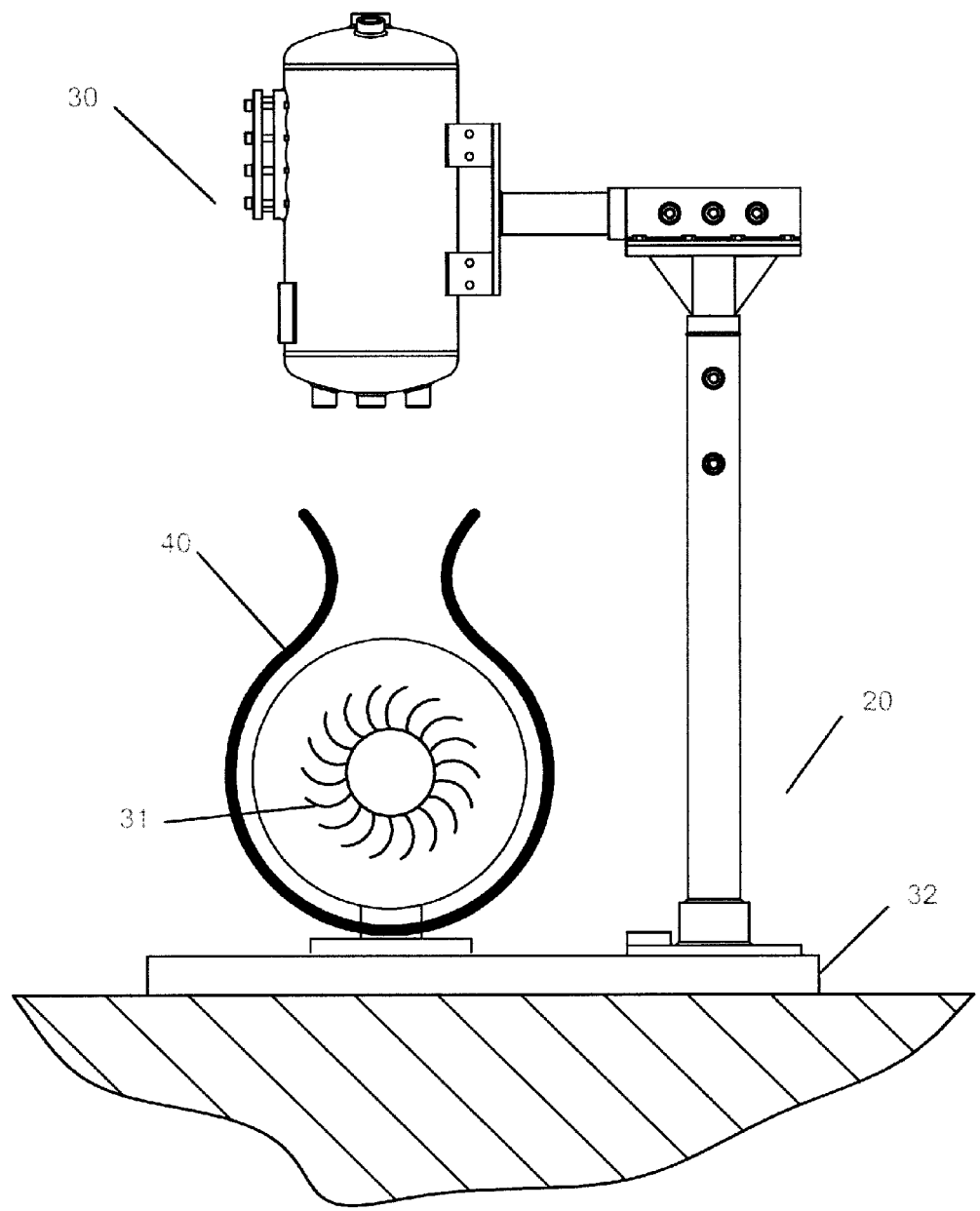

FIG. 4, corresponds to FIG. 3 and shows an end view of the stand of the invention with an air direction device installed around the motor.

DETAILED DESCRIPTION OF THE PREFERRED EMBODIMENTS AND DRAWING FIGURES

This invention will now be described by way of examples only, with reference to the accompanying drawings FIG. 1 is an isometric view of a vertically adjusting stand 10 of the first embodiment of the invention.

Said stand 10 comprises of a base 11 which preferably has one or more orifices 12 for securing said base to the floor.

The base 11 is secured to a fixed vertical member 13 which preferably has one or more orifices 14.

Floating vertical member 15 is in sliding communication with fixed vertical member 13 and again has one or more orifices 16 which correlate with orifice 14.

A vessel attachment means 17 preferably with one or more orifices 18 is secured to floating vertical member 15.

The first embodiment of the invention, as shown described with reference to FIG. 1 provides a vertically adjusting stand for use with a system support system which is connected to a sealing device for sealing an item of rotating equipment.

FIG. 2 is an isometric view of a vertically and horizontally adjusting stand 20 of the second embodiment of the invention Once again, stand 20 has a base 21 and a fixed 22 and floating 23 vertical members as previously described for vertical height adjustment means. Secured to the floating vertical member 23 is a fixed horizontal member 24 preferably with one or more orifices 25.

Floating horizontal member 26 is in sliding communication with fixed horizontal member 24 and again has one or more orifices 27 which correlate with orifice 25.

A vessel attachment means 28 preferably with one or more orifices 29 is secured to floating vertical member 26.

The second embodiment of the invention, as shown described with reference to FIG. 2 provides a vertically and horizontally adjusting stand for use with a system support system which is connected to a sealing device for sealing an item of rotating equipment.

Clearly the invention anticipates a horizontally adjusting stand connected to a fixed vertical height member also.

FIG. 3, is an isometric view of the stand of the invention 20, mounted with a seal support system 30 and positioned vertically over an electric motor 31 of an item of rotating equipment 32.

From FIG. 1, the third embodiment of the invention provides means to accurately position the seal support system 30 over the electric motor 31 so to maximize the heat removal effectiveness of the air circulated from the electric motor 31 to the system 30 during operation.

It will be understood by the reader that flowing air has far better heat removal properties than stagnant air. Conventionally mounted seal support systems are mounted in stagnant air therefore require ancillary devices to remove the heat from the fluid in the system.

The third embodiment of the invention therefore provides a high efficiency means of cooling the seal support system without using third party additional devices that are not otherwise required for the basic operation of the rotating equipment.

FIG. 4 corresponds to FIG. 3 and shows an end view of the stand 20 of the invention mounted over an electric motor 31 which is mounted an item of rotating equipment 32.

Surrounding the electric motor 31 is an air direction device 40 installed around the electric motor 31. Said air direction device 40 is shaped in such a manner that it directs all the air which is expelled/displaced from the motor during dynamic operation towards the seal support system 30.

The air direction device 40 provides the fourth embodiment of the invention and clearly could enclose any amount of the electric motor 31 circumference. The invention therefore anticipates that a part circumferential device, covering say 120 degrees of the electric motor 31 circumference, could be attached to the fixed or floating vertical members of the stand 20.

Clearly said air direction device 40 could also be secured to the stand 20 of any stationary part of the rotating equipment 32 as deemed appropriate.

The benefits of the invention should be apparent in that the embodiments of the invention permit accurate positioning of a seal support system which benefits fluid convention principles or accelerated air cooling preferably utilizing existing available means rather than additional means.

While only several embodiments of the present invention have been shown and described, it will be obvious to those skilled in the art that many modifications may be made to the present invention without departing from the spirit and scope thereof.

What is claimed is:

1. A seal support system for a device for sealing an item of rotating equipment, comprising: a vessel for holding fluid for supply to a sealing device, a stand having a base, the stand being secured to said vessel with vessel being movable relative to said base, an air direction device for at least partially surrounding means for generating air movement for directing moving air from a vicinity of the means for generating air movement along a path provided by said air direction device into which the vessel is positionable.

2. The seal support system according to claim 1, wherein the stand includes a fixed vertical member secured to the stand, a floating vertical member in communication with the fixed vertical member, and securing device between said fixed vertical member and said floating vertical member.

3. The seal support system according to claim 2, wherein said adjustment and securing devices comprises at least one peg member which inserts in a corresponding orifice in both said fixed vertical member and said floating vertical member.

4. The seal support system according to claim 2, wherein said floating vertical member has a plurality of vertically spaced orifices corresponding to one or more orifices in said fixed vertical member.

5. The seal support system according to claim 1, wherein said base member has one or more orifices.

6. The seal support system according to claim 1, wherein said stand has vertical adjustment device and horizontal adjustment device.

7. The seal support system according to claim 1, wherein said stand has horizontal adjustment device secured to a fixed vertical member.

8. The seal support system according to claim 6, wherein said horizontal adjustment devices comprises a fixed horizontal member secured to a floating vertical member in communication with the fixed horizontal member.

9. The seal support system according to claim 2, wherein said stand has a vertical adjustment device and horizontal adjustment device.

10. The seal support system according to claim 9, wherein said horizontal adjustment device comprises a fixed horizontal member secured to said floating vertical member in communication with said fixed horizontal member.

11. The seal support system according to claim 1, wherein said air direction device comprises a shroud shaped so that it directs induced air towards said seal support system mounted on the stand.

12. A method for cooling fluid contained within a vessel forming part of a seal support system for a device for sealing an item of rotating equipment including means for generating air movement, said method comprising the steps of: mounting the vessel on an adjustable stand, mounting air direction device so as, at least partially, to surround the means for generating air movement so that, in use, a path of air from the means for generating air movement is provided by said air direction device, and adjusting the stand for positioning the vessel within said path.

13. The seal support system according to claim 1, wherein the means for generating air movement is an electric motor.

* * * * *